United States Patent
Onishi et al.

(10) Patent No.: US 9,518,168 B2
(45) Date of Patent: *Dec. 13, 2016

(54) POLYLACTIC ACID RESIN COMPOSITION AND RESIN MOLDED ARTICLE THEREOF

(71) Applicants: Hideaki Onishi, Kyoto (JP); Ken Morishita, Kyoto (JP)

(72) Inventors: Hideaki Onishi, Kyoto (JP); Ken Morishita, Kyoto (JP)

(73) Assignee: DAI-ICHI KOGYO SEIYAKU CO., LTD., Kyoto-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/603,159

(22) Filed: Jan. 22, 2015

(65) Prior Publication Data

US 2015/0197621 A1    Jul. 16, 2015

Related U.S. Application Data

(63) Continuation of application No. 13/711,595, filed on Dec. 11, 2012, now abandoned.

(60) Provisional application No. 61/570,515, filed on Dec. 14, 2011.

(30) Foreign Application Priority Data

Dec. 12, 2011 (JP) .................................. 2011-271593
Aug. 23, 2012 (JP) .................................. 2012-183998

(51) Int. Cl.
| | |
|---|---|
| *C08K 5/103* | (2006.01) |
| *C08K 5/20* | (2006.01) |
| *C08K 5/151* | (2006.01) |
| *C08K 5/1535* | (2006.01) |

(52) U.S. Cl.
CPC ............... *C08K 5/20* (2013.01); *C08K 5/103* (2013.01); *C08K 5/151* (2013.01); *C08K 5/1535* (2013.01)

(58) Field of Classification Search
CPC ........... C08K 5/20; C08K 5/103; C08K 5/151; C08K 5/1535; C08L 67/04
See application file for complete search history.

(56) References Cited

U.S. PATENT DOCUMENTS

| 5,641,502 A | 6/1997 | Skalla et al. |
| 6,573,340 B1 | 6/2003 | Khemani et al. |
| 8,900,698 B2 | 12/2014 | Tabata et al. |
| 2002/0107147 A1 | 8/2002 | Hayashi et al. |
| 2008/0262150 A1 | 10/2008 | Takenaka et al. |
| 2010/0130651 A1 | 5/2010 | Fukawa et al. |
| 2010/0201037 A1 | 8/2010 | Takenaka et al. |
| 2011/0178211 A1 | 7/2011 | Kawahara et al. |
| 2012/0296017 A1 | 11/2012 | Tsuboi et al. |
| 2014/0296399 A1 | 10/2014 | Tsuboi et al. |

FOREIGN PATENT DOCUMENTS

| CN | 101768345 A | 7/2010 |
| CN | 101801636 A | 8/2010 |
| CN | 102753621 A | 10/2012 |
| JP | 2006-083315 A | 3/2006 |
| JP | 2007130895 A | 5/2007 |
| JP | 2007-246624 A | 9/2007 |
| JP | 2008-031375 A | 2/2008 |
| JP | 2008-150492 A | 7/2008 |
| JP | 2009-024081 A | 2/2009 |
| JP | 2011-203042 A | 10/2011 |
| WO | 2008/010318 A1 | 1/2008 |
| WO | 2008075775 A1 | 6/2008 |
| WO | 2012-014670 A1 | 2/2012 |

OTHER PUBLICATIONS

Bruce A. Kennedy Surface Mining $2^{nd}$ Edition. Society for Mining, Metallurgy, and Exploration; Mar. 1, 1990, pp. 131-133.*
Li et al. Flame-retardancy and anti-dripping effects of intumescent flame retardant incorporating montmorillonite on poly(lactic acid). Polymer for Advanced Technologies. vol. 20, Issue 12, Dec. 2008, abstract.*
Extended European Search Report for EP 12195688.2-1302 dated Mar. 15, 2013.
Extended European Search Report for EP 12194691.6-1302 dated Apr. 23, 2013.
Extended European Search Report for EP 12195694.0-1301 dated Dec. 4, 2013.
Rheodol; TW-IS399C MSDS Kao Corporation; Jan. 7, 2009.
Notification of Transmittal of Translation of the International Preliminary Report on Patentability (Form PCT/IB/338) of International Application No. PCT/JP2013/080484 mailed Jun. 25, 2015 with Forms PCT/IB/373 and PCT/ISA/237 (7 pages).

* cited by examiner

*Primary Examiner* — John Uselding
(74) *Attorney, Agent, or Firm* — Westerman, Hattori, Daniels & Adrian, LLP

(57) ABSTRACT

Provided are a polylactic acid resin composition excellent in transparency, heat resistance, and migration resistance, and excellent in productivity at the time of the mold forming thereof, and a resin molded article thereof. The polylactic acid resin composition includes a polylactic acid; a reaction product of at least one selected from the group consisting of sorbitol, mannitol, and dehydration condensates thereof, an alkylene oxide mainly formed of ethylene oxide, and a fatty acid having 8 to 24 carbon atoms; and a fatty acid amide having a hydroxyl group.

24 Claims, No Drawings

POLYLACTIC ACID RESIN COMPOSITION AND RESIN MOLDED ARTICLE THEREOF

CROSS-REFERENCE TO RELATED APPLICATIONS

This application claims the benefit of U.S. application Ser. No. 13/711,595 filed on Dec. 11, 2012, U.S. Provisional Application No. 61/570,515 filed on Dec. 14, 2011, and Japanese Application Nos. JP2011-271593 filed on Dec. 12, 2011 and JP2012-183998 filed on Aug. 23, 2012 the complete disclosures of which, in their entireties, are hereby incorporated by reference.

BACKGROUND

1. Technical Field

The embodiments herein relate to a polylactic acid resin composition and a resin molded article thereof.

2. Description of the Related Art

While depletion of petroleum resources, a $CO_2$ reduction, and the like have been perceived as problems, a polylactic acid using lactic acid obtained by fermenting a grain resource such as corn as a raw material has been attracting attention. Polylactic acid is a resin derived from a plant as described above and has the following characteristics: Polylactic acid has high rigidity, and is excellent in transparency. However, its applications have been limited as compared to an ordinary resin because of, for example, the following reasons: Polylactic acid generally has low heat resistance and low impact resistance, and hence typically cannot be used under a high-temperature condition.

Available as a method of improving the heat resistance of the polylactic acid is, for example, a method involving increasing its crystallinity through a heat treatment (annealing treatment). However, the method involves, for example, the following problems. The method is not practical owing to an extremely long heat treatment time and transparency of the polylactic acid reduces in association with progress of its crystallization.

In view of the foregoing, blending of various plasticizers and crystal nucleating agents into a resin composition using the polylactic acid as a polymer has been investigated as a method of solving those problems in recent years.

For example, the following has been proposed as an example of the blending (International Publication No. WO2008/010318A). A fatty acid ester formed of a dehydration condensate of a sugar alcohol and a fatty acid is used as the plasticizer, and a layered silicate is used as the crystal nucleating agent.

In addition to the foregoing, for example, the following has been proposed (Japanese Patent Application Laid-open No. JP-A-2007-130895). A saturated ester is used as the plasticizer and an aliphatic ester or a fatty acid amide is used as the crystal nucleating agent.

However, generally the applications where the resin composition disclosed in WO2008/010318A can be used are extremely limited owing to its low transparency and low heat resistance. Moreover, the resin composition involves a problem in that productivity at the time of its mold forming is poor because a molded article thereof is liable to deform upon its removal from the mold unless a molding time during the mold forming is set to be long.

On the other hand, the transparency of the resin composition disclosed in JP-A-2007-130895 has been somewhat improved. However, a molded article excellent in transparency and migration resistance typically cannot be obtained from the resin composition because the resin composition is liable to be migrated in water or an alcohol. Further, the resin composition still has room for improvement because its productivity at the time of the mold forming thereof is not sufficient.

Accordingly, it would be desirable to provide a polylactic acid resin composition excellent in transparency, heat resistance, and migration resistance, and excellent in productivity at the time of the mold forming thereof, and a resin molded article thereof.

SUMMARY

In view of the foregoing, an embodiment herein provides a polylactic acid resin composition, including the following components: (A) a polylactic acid; (B) a reaction product of at least one selected from the group consisting of sorbitol, mannitol, and dehydration condensates thereof, and an alkylene oxide mainly formed of ethylene oxide, and a fatty acid having 8 to 24 carbon atoms; and (C) a fatty acid amide having a hydroxyl group.

Another embodiment provides a resin molded article formed of the polylactic acid resin composition described above.

The inventors of the present invention have made extensive studies to obtain a polylactic acid resin composition excellent in transparency, heat resistance, and migration resistance, and excellent in productivity at the time of the mold forming thereof. As a result, the inventors of the present invention have found that a polylactic acid resin composition excellent in transparency, heat resistance, and migration resistance, and excellent in productivity at the time of the mold forming thereof, and a resin molded article thereof can be achieved, and in particular, the transparency is extremely enhanced by the following procedure. A specific reaction product, i.e., the reaction product (component B) of at least one selected from the group consisting of sorbitol, mannitol, and the dehydration condensates thereof, the alkylene oxide mainly formed of ethylene oxide, and the fatty acid having 8 to 24 carbon atoms is blended as a plasticizer into a resin composition using a polylactic acid as a polymer, and the fatty acid amide (component C) having a hydroxyl group is further blended as a crystal nucleating agent into the composition.

As described above, the polylactic acid resin composition of the present invention contains the polylactic acid (component A), the specific reaction product (component B), and the fatty acid amide (component C) having a hydroxyl group. Therefore, the composition is excellent in transparency, heat resistance, and migration resistance, and can exert an excellent effect on its productivity at the time of the mold forming (a resin molded article thereof can be efficiently obtained within a short time period without the occurrence of the deformation at the time of its removal from the mold). In particular, the transparency is extremely enhanced, and hence the composition can be utilized in applications requiring high transparency (such as food packaging containers). In addition, the composition exerts the following effect. The composition eliminates the need for countermeasures against high temperatures at the time of, for example, its transportation because the composition is excellent in heat resistance and the like.

In particular, when the reaction product as the component B contains an oxyethylene group in a specific range, the polylactic acid resin composition of the present invention and the resin molded article thereof each become additionally excellent in transparency, impact resistance, productivity at the time of molding, and the like.

In addition, when the reaction product as the component B has a hydroxyl group derived from the alkylene oxide, the polylactic acid resin composition of the present invention and the resin molded article thereof each become additionally excellent in transparency, compatibility, and dispersibility.

Further, when the reaction product as the component B has a specific amount of an ester group in a molecule thereof, the polylactic acid resin composition of the present invention and the resin molded article thereof each become additionally excellent in transparency.

In addition, when the fatty acid amide as the component C is a bisamide compound obtained by causing a fatty acid having 8 to 24 carbon atoms and having a hydroxyl group, and a compound having two amino groups to react with each other, the polylactic acid resin composition of the present invention and the resin molded article thereof each become additionally excellent in transparency, compatibility, dispersibility, and the like.

In addition, when the content of the reaction product as the component B falls within a specific range, the polylactic acid resin composition of the present invention and the resin molded article thereof each become additionally excellent in transparency, impact resistance, productivity at the time of molding, and the like.

In addition, when the content of the fatty acid amide as the component C falls within a specific range, the polylactic acid resin composition of the present invention and the resin molded article thereof each become additionally excellent in transparency and productivity at the time of molding.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

According to the embodiments herein, the polylactic acid resin composition contains the polylactic acid (component A), the specific reaction product (component B) (reaction product of at least one selected from the group consisting of sorbitol, mannitol, and the dehydration condensates thereof, the alkylene oxide mainly formed of ethylene oxide, and the fatty acid having 8 to 24 carbon atoms), and the fatty acid amide (component C) having a hydroxyl group. In the polylactic acid resin composition of the present invention, the reaction product as the component (B) typically has an action as a plasticizer and the fatty acid amide as the component (C) has an action as a crystal nucleating agent. It should be noted that the polylactic acid resin composition of the present invention can contain, for example, a resin such as an acrylic resin, an inorganic filler such as silica, a hydrolysis inhibitor, or an impact modifier in addition to the above-mentioned components as required.

Polylactic Acid

The polylactic acid (component A) in the polylactic acid resin composition of the present invention refers to both of a polylactic acid obtained by subjecting only lactic acid as a raw material monomer to condensation polymerization, and a polylactic acid obtained by subjecting a lactic acid component and a hydroxycarboxylic acid component except lactic acid (hereinafter, sometimes simply referred to as "hydroxycarboxylic acid component") as raw material monomers to condensation polymerization.

Optical isomers, i.e., L-lactic acid (L-form) and D-lactic acid (D-form) exist for lactic acid. Although only one of the optical isomers may, or both the isomers may each, be incorporated as a lactic acid component in the present invention, lactic acid having a high optical purity, the lactic acid using one of the optical isomers as a main component, is preferably used from the viewpoints of: the achievement of compatibility between the flexibility of the polylactic acid resin composition, and its rigidity and heat resistance; and productivity at the time of molding. It should be noted that the term "main component" as used herein refers to a component whose content in the lactic acid component is 80 mol % or more.

The content of the L-form or the D-form in the lactic acid component, i.e., the content of the more abundant one of the isomers in the case where only the lactic acid component is subjected to condensation polymerization is preferably 95.0 mol % or more, more preferably 98 mol % or more from the above-mentioned viewpoints.

The content of the L-form or the D-form in the lactic acid component, i.e., the content of the more abundant one of the isomers in the case where the lactic acid component and the hydroxycarboxylic acid component are subjected to condensation polymerization is preferably 95.0 mol % or more, more preferably 98 mol % or more from the above-mentioned viewpoints.

In addition to a product obtained by subjecting only the D-form as lactic acid to condensation polymerization, a product obtained by subjecting only the L-form as lactic acid to condensation polymerization, and a product obtained by copolymerizing the D-form and the L-form, a product obtained by blending a polylactic acid using the L-from as a main component and a polylactic acid using the D-form as a main component at arbitrary ratios may also be used as the polylactic acid.

On the other hand, examples of the hydroxycarboxylic acid component except lactic acid include hydroxycarboxylic acid compounds such as glycolic acid, hydroxybutyric acid, hydroxyvaleric acid, hydroxypentanoic acid, hydroxycaproic acid, and hydroxyheptanoic acid. One kind of those hydroxycarboxylic acid components is used alone, or two or more kinds thereof are used in combination. Of those, glycolic acid and hydroxycaproic acid are preferred.

In addition, in the present invention, dimers of lactic acid and the hydroxycarboxylic acid compound may be incorporated into each component. For example, a lactide as a cyclic dimer of lactic acid is used as the dimer of lactic acid, and for example, glycolide as a cyclic dimer of glycolic acid is used as the dimer of the hydroxycarboxylic acid compound. It should be noted that the lactides are classified into an L-lactide as a cyclic dimer of L-lactic acid, a D-lactide as a cyclic dimer of D-lactic acid, a meso-lactide obtained by the cyclic dimerization of D-lactic acid and L-lactic acid, and a DL-lactide as a racemic mixture of the D-lactide and the L-lactide. Although each of the lactides can be used in the present invention, the D-lactide and the L-lactide are preferred from the viewpoints of the flexibility and rigidity of the polylactic acid resin composition, and productivity at the time of the molding of the polylactic acid resin. It should be noted that the dimer of lactic acid may be incorporated into the lactic acid component in each of the case where only the lactic acid component is subjected to condensation polymerization, and the case where the lactic acid component and the hydroxycarboxylic acid component are subjected to condensation polymerization.

The condensation polymerization reaction of only the lactic acid component and the condensation polymerization reaction of the lactic acid component and the hydroxycarboxylic acid component are not particularly limited, and can each be performed by employing a known method.

In addition, the weight-average molecular weight of the polylactic acid in the present invention falls within the range of typically 10,000 to 400,000, preferably 50,000 to 400,000. The weight-average molecular weight more preferably falls within the range of 100,000 to 300,000. That is because of the following reasons. When the weight-average molecular weight of the polylactic acid falls short of the range, the mechanical properties of a resin molded article are low. In contrast, when the weight-average molecular weight of the polylactic acid outstrips the range, the polylactic acid becomes poor in flowability at the time of the molding thereof. It should be noted that the weight-average molecular weight of the polylactic acid can be determined in terms of styrene having a known molecular weight as a reference by using a gel permeation chromatograph (GPC), chloroform as a solvent, a high-temperature SEC column (GMHHR-H series) manufactured by TOSOH CORPORATION as a column with its flow rate and column temperature set to 1.0 mL/min and 40° C., respectively, and a refractive index detector (RI) as a detector.

Plasticizer

The reaction product (component B) of at least one selected from the group consisting of sorbitol, mannitol, and the dehydration condensates thereof, the alkylene oxide mainly formed of ethylene oxide, and the fatty acid having 8 to 24 carbon atoms is used as the plasticizer in the polylactic acid resin composition of the present invention. Examples of the dehydration condensate include sorbitan, isosorbide, mannitan, and isomannide. In addition, the term "alkylene oxide mainly formed of ethylene oxide" indicates that ethylene oxide accounts for over half of the alkylene oxide and is intended to encompass an alkylene oxide entirely formed of ethylene oxide. It should be noted that, when an alkylene oxide except ethylene oxide is used in combination with ethylene oxide as the alkylene oxides, for example, propylene oxide, butylene oxide, or isobutylene oxide is used in combination.

A method of producing the reaction product (component B) is, for example, a method involving: causing sorbitol and the fatty acid to react with each other under heating to esterify the sorbitol; and subjecting ethylene oxide to an addition reaction with the resultant under heating in an autoclave to provide the reaction product (component B). Alternatively, after sorbitan obtained by subjecting sorbitol to dehydration condensation and the fatty acid have been caused to react with each other so that the sorbitol may be esterified, ethylene oxide may be added to the resultant in the same manner as in the above-mentioned method. Alternatively, after ethylene oxide has been added to sorbitan, the fatty acid may be caused to react with the resultant. Alternatively, after a fatty acid ester has been synthesized from the fatty acid and a monohydric alcohol having a small number of carbon atoms (methanol or ethanol) in advance, followed by an ester exchange reaction of the ester with sorbitol and sorbitan, ethylene oxide may be added to the resultant in the same manner as in the above-mentioned method. Also available is, for example, a method involving: synthesizing a fatty acid ester from the fatty acid and a monohydric alcohol having a small number of carbon atoms (methanol or ethanol) in advance; and subjecting the ester to an ester exchange reaction with ethylene oxide adducts of sorbitol and sorbitan to provide the reaction product (component B). In the polylactic acid resin composition of the present invention, one kind of the reaction products (components B) thus obtained is used alone, or two or more kinds thereof are used in combination.

In addition, the content of an oxyethylene group in the reaction product (component B) is preferably 30 to 95 wt %, more preferably 40 to 95 wt %, even more preferably 50 to 95 wt % from such a viewpoint that the polylactic acid resin composition of the present invention is excellent in transparency, impact resistance, productivity at the time of molding, and the like.

In addition, the reaction product (component B) preferably has a hydroxyl group derived from the alkylene oxide from such a viewpoint that the polylactic acid resin composition of the present invention is excellent in transparency, compatibility, and dispersibility. The phrase "having a hydroxyl group derived from the alkylene oxide" as used herein means a state where hydroxyl groups on the side of the alkylene oxide partially remain without undergoing any esterification with the fatty acid. Such reaction product can be obtained by, for example, subjecting all the hydroxyl groups sorbitol or mannitol, or a dehydration condensate thereof has to an addition reaction with the alkylene oxide, and subjecting only part of the terminal hydroxyl groups on the side of the alkylene oxide after the addition reaction to an esterification reaction with the fatty acid.

In addition, the reaction product (component B) has preferably 0.5 or more and less than 2.5, more preferably 0.5 or more and 2.0 or less ester groups on average in a molecule thereof from the viewpoint of the transparency.

Further, the fatty acid having 8 to 24 carbon atoms is used in the synthesis of the reaction product (component B) and a fatty acid having 10 to 24, more preferably 12 to 24 carbon atoms is preferably used from such a viewpoint that the polylactic acid resin composition of the present invention is excellent in transparency, impact resistance, and in migration resistance for water and an alcohol-based solvent. That is because of the following reasons: when the number of carbon atoms in the fatty acid falls short of the range, desired impact resistance is hardly obtained. Further, the amount of the composition to be migrated in water or the alcohol-based solvent increases. In contrast, when the number of carbon atoms in the fatty acid outstrips the range, the composition has bad compatibility with the polylactic acid (A) as a polymer and is poor in transparency. It should be noted that a fatty acid corresponding to any one of a saturated fatty acid and an unsaturated fatty acid may be used as the fatty acid, and the fatty acids may be used in combination. Alternatively, the fatty acid may be a mixture of fatty acids transformed from oils and fats. In that case, a mixture whose average number of carbon atoms falls within the range is used.

In addition, specific examples of the reaction product (component B) include a polyoxyethylene sorbitol caprylate, a polyoxyethylene sorbitol caprate, a polyoxyethylene sorbitol laurate, a polyoxyethylene sorbitol cocoate, a polyoxyethylene sorbitol myristate, a polyoxyethylene sorbitol palmitate, a polyoxyethylene sorbitol linoleate, a polyoxyethylene sorbitol stearate, a polyoxyethylene sorbitol isostearate, a polyoxyethylene sorbitol-12-hydroxystearate, a polyoxyethylene sorbitol oleate, a polyoxyethylene sorbitol eicosanoate, a polyoxyethylene sorbitol behenate, a polyoxyethylene sorbitol lignocerate, a polyoxyethylene sorbitan caprylate, a polyoxyethylene sorbitan caprate, a polyoxyethylene sorbitan laurate, a polyoxyethylene sorbitan cocoate, a polyoxyethylene sorbitan myristate, a polyoxyethylene sorbitan palmitate, a polyoxyethylene sorbitan linoleate, a polyoxyethylene sorbitan stearate, a polyoxyethylene sorbitan isostearate, a polyoxyethylene sorbitan-12-hydroxystearate, a polyoxyethylene sorbitan oleate, a polyoxyethylene sorbitan eicosanoate, a polyoxyethylene sorbitan behenate, a polyoxyethylene sorbitan lignocerate, a polyoxyethylene isosorbide caprylate, a polyoxyethylene isosorbide caprate, a polyoxyethylene isosorbide laurate, a polyoxyethylene isosorbide cocoate, a polyoxyethylene isosorbide myristate, a polyoxyethylene isosorbide palmitate, a polyoxyethylene isosorbide linoleate, a polyoxyethylene isosorbide stearate, a polyoxyethylene isosorbide isostearate, a polyoxyethylene isosorbide-12-hydroxystearate, a polyoxyethylene isosorbide oleate, a polyoxyethylene isosorbide eicosanoate, a polyoxyethylene isosorbide behenate, a polyoxyethylene isosorbide lignocerate, a polyoxyethylene mannitol caprylate, a polyoxyethylene mannitol caprate, a polyoxyethylene mannitol laurate, a polyoxyethylene mannitol cocoate, a polyoxyethylene mannitol myristate, a polyoxyethylene mannitol palmitate, a polyoxyethylene mannitol linoleate, a polyoxyethylene mannitol stearate, a polyoxyethylene mannitol isostearate, a polyoxyethylene mannitol-12-hydroxystearate, a polyoxyethylene mannitol oleate, a polyoxyethylene mannitol eicosanoate, a polyoxyethylene mannitol behenate, a polyoxyethylene mannitol lignocerate, a polyoxyethylene mannitan caprylate, a polyoxyethylene mannitan caprate, a polyoxyethylene mannitan laurate, a polyoxyethylene mannitan cocoate, a polyoxyethylene mannitan myristate, a polyoxyethylene mannitan palmitate, a polyoxyethylene mannitan linoleate, a polyoxyethylene mannitan stearate, a polyoxyethylene mannitan isostearate, a polyoxyethylene mannitan-12-hydroxystearate, a polyoxyethylene mannitan oleate, a polyoxyethylene mannitan eicosanoate, a polyoxyethylene mannitan behenate, a polyoxyethylene mannitan lignocerate, a polyoxyethylene isomannide caprylate, a polyoxyethylene isomannide caprate, a polyoxyethylene isomannide laurate, a polyoxyethylene isomannide cocoate, a polyoxyethylene isomannide myristate, a polyoxyethylene isomannide palmitate, a polyoxyethylene isomannide linoleate, a polyoxyethylene isomannide stearate, a polyoxyethylene isomannide isostearate, a polyoxyethylene isomannide-12-hydroxystearate, a polyoxyethylene isomannide oleate, a polyoxyethylene isomannide eicosanoate, a polyoxyethylene isomannide behenate, and a polyoxyethylene isomannide lignocerate. One kind of those reaction products is used alone, or two or more kinds thereof are used in combination. It should be noted that as one or a plurality of fatty acid ester groups exist in one molecule of each of the reaction products listed above, the term "polyoxyethylene sorbitol caprylate," for example, is intended to encompass "polyoxyethylene sorbitol monocaprylate, polyoxyethylene sorbitol sesquicaprylate, polyoxyethylene sorbitol dicaprylate, and the like."

The content of the reaction product (component B) in the polylactic acid resin composition of the present invention falls within the range of preferably 0.5 to 10 parts by weight, more preferably 1 to 10 parts by weight, even more preferably 2 to 10 parts by weight, most preferably 3 to 10 parts by weight with respect to 100 parts by weight of the polylactic acid (component A) from such a viewpoint that the composition becomes excellent in transparency, impact resistance, productivity at the time of the molding thereof, and the like.

Crystal Nucleating Agent

The fatty acid amide (component C) having a hydroxyl group is used as the crystal nucleating agent in the polylactic acid resin composition of the present invention from the viewpoints of, for example, the moldability, heat resistance, impact resistance, and transparency of a polylactic acid resin molded article.

In addition, the fatty acid amide (component C) is preferably a bisamide compound obtained by causing a fatty acid having 8 to 24 carbon atoms and having a hydroxyl group, and a compound having two amino groups to react with each other because the polylactic acid resin composition of the present invention becomes excellent in transparency, compatibility, dispersibility, and the like. It should be noted that a fatty acid corresponding to any one of a saturated fatty acid and an unsaturated fatty acid may be used as the fatty acid, and the fatty acids may be used in combination. Alternatively, the fatty acid may be a mixture of fatty acids transformed from oils and fats. In that case, a mixture whose average number of carbon atoms falls within the range is used.

In addition, specific examples of the fatty acid amide (component C) include N,N'-ethylenebis-8-hydroxycapric acid amide, N,N'-butylenebis-8-hydroxycapric acid amide, N,N'-hexamethylenebis-8-hydroxycapric acid amide, N,N'-m-xylylenebis-8-hydroxycapric acid amide, N,N'-ethylenebis-12-hydroxylauric acid amide, N,N'-butylenebis-10-hydroxylauric acid amide, N,N'-hexamethylenebis-10-hydroxylauric acid amide, N,N'-m-xylylenebis-10-hydroxylauric acid amide, N,N'-ethylenebis-11-hydroxymyristic acid amide, N,N'-butylenebis-11-hydroxymyristic acid amide, N,N'-hexamethylenebis-11-hydroxymyristic acid amide, N,N'-m-xylylenebis-11-hydroxymyristic acid amide, N,N'-ethylenebis-16-hydroxypalmitic acid amide, N,N'-butylenebis-16-hydroxypalmitic acid amide, N,N'-hexamethylenebis-16-hydroxypalmitic acid amide, N,N'-m-xylylenebis-16-hydroxypalmitic acid amide, N,N'-ethylenebis-12-hydroxystearic acid amide, N,N'-butylenebis-12-hydroxystearic acid amide, N,N'-hexamethylenebis-12-hydroxystearic acid amide, N,N'-m-xylylenebis-12-hydroxystearic acid amide, N,N'-butylenebis-2-hydroxyarachidic acid amide, N,N'-hexamethylenebis-2-hydroxyarachidic acid amide, N,N'-m-xylylenebis-2-hydroxyarachidic acid amide, N,N'-ethylenebis-2-hydroxybehenic acid amide, N,N'-butylenebis-2-hydroxybehenic acid amide, N,N'-hexamethylenebis-2-hydroxybehenic acid amide, N,N'-m-xylylenebis-2-hydroxybehenic acid amide, N,N'-ethylenebis-2-hydroxylignoceric acid amide, N,N'-butylenebis-2-hydroxylignoceric acid amide, N,N'-hexamethylenebis-2-hydroxylignoceric acid amide, N,N'-m-xylylenebis-2-hydroxylignoceric acid amide, N,N'-ethylenebis-12-hydroxyoleic acid amide, N,N'-butylenebis-12-hydroxyoleic acid amide, N,N'-hexamethylenebis-12-hydroxyoleic acid amide, N,N'-m-xylylenebis-12-hydroxyoleic acid amide, N,N'-ethylenebis-11-hydroxylinoleic acid amide, N,N'-butylenebis-11-hydroxylinoleic acid amide, N,N'-hexamethylenebis-11-hydroxylinoleic acid amide, N,N'-m-xylylenebis-11-hydroxylinoleic acid amide, N,N'-ethylenebis-11-hydroxyarachidonic acid amide, N,N'-butylenebis-11-hydroxyarachidonic acid amide, N,N'-hexamethylenebis-11-hydroxyarachidonic acid amide, and N,N'-m-xylylenebis-11-hydroxyarachidonic acid amide. One kind of those fatty acid amides is used alone, or two or more kinds thereof are used in combination.

The content of the fatty acid amide (component C) in the polylactic acid resin composition of the present invention falls within the range of preferably 0.1 to 0.7 part by weight with respect to 100 parts by weight of the polylactic acid (component A) from such a viewpoint that the composition becomes excellent in transparency and productivity at the time of the molding.

Other Resin

In addition to the components (A) to (C), any other resin may be appropriately incorporated into the polylactic acid resin composition of the present invention as long as an effect of the present invention is not impaired (i.e., in the range of less than 20 wt %, preferably 1 to 15 wt %, more preferably 1 to 10 wt % of the whole polylactic acid resin composition). Examples of the other resin include: thermoplastic resins such as an acrylic resin, a polypropylene, a polystyrene, an ABS resin, an AS resin, a polyphenylene sulfide, a polyetheretherketone, a polyester, a polyacetal, a polysulfone, a polyphenylene oxide, and a polyetherimide; and thermosetting resins such as a phenol resin, a melamine resin, an unsaturated polyester resin, a silicone resin, and an epoxy resin. One kind of those resins is used alone, or two or more kinds thereof are used in combination. Of those, an acrylic resin is preferred from the viewpoints of excellence in impact resistance and the like, and a smaller influence on the transparency.

Inorganic Filler

Further, an inorganic filler may be incorporated into the polylactic acid resin composition of the present invention as required. Specific examples of the inorganic filler include silica, surface-treated silica treated with a silane coupling agent or the like, talc, clay, mica, zeolite, bentonite, montmorillonite, a glass fiber, and a carbon fiber. One kind of those inorganic fillers is used alone, or two or more kinds thereof are used in combination. Of those, silica (including surface-treated silica) is preferred from such a viewpoint that the composition becomes excellent in impact resistance and bending strength.

In addition, the content of the inorganic filler in the polylactic acid resin composition of the present invention falls within the range of preferably 0.01 to 2 parts by weight, more preferably 0.01 to 1 part by weight with respect to 100 parts by weight of the polylactic acid (component A) from such a viewpoint that the composition becomes excellent in impact resistance, bending strength, and the like.

Hydrolysis Inhibitor

In addition, a hydrolysis inhibitor may be incorporated into the polylactic acid resin composition of the present invention as required. Examples of the hydrolysis inhibitor include carbodiimide compounds such as a polycarbodiimide compound and a monocarbodiimide compound. Of those, a polycarbodiimide compound is preferred from the viewpoint of the moldability of the polylactic acid resin molded article, and a monocarbodiimide compound is more preferred from the viewpoints of the heat resistance, moldability, flowability, and impact resistance of the polylactic acid resin molded article, and the blooming resistance of the crystal nucleating agent.

Examples of the polycarbodiimide compound include a poly(4,4'-diphenylmethanecarbodiimide), a poly(4,4'-dicyclohexylmethanecarbodiimide), a poly(1,3,5-triisopropylbenzene)polycarbodiimide, and a poly(1,3,5-triisopropylbenzene and 1,5-diisopropylbenzene)polycarbodiimide. The monocarbodiimide compound is, for example, N,N'-di-2,6-diisopropylphenylcarbodiimide.

In addition, the content of the hydrolysis inhibitor in the polylactic acid resin composition of the present invention falls within the range of preferably 0.05 to 2 parts by weight, more preferably 0.1 to 1 part by weight with respect to 100 parts by weight of the polylactic acid (component A) from the viewpoint of the moldability of the polylactic acid resin molded article.

Impact Modifier

In addition, an impact modifier may be incorporated into the polylactic acid resin composition of the present invention as required from the viewpoints of improvements in its physical properties such as flexibility. A (meth)acrylic acid polymer, an ethylene-(meth)acrylic acid copolymer, an ethylene-alkyl (meth)acrylate copolymer, an epoxy-modified silicone acrylic rubber, a copolymer of a diene and a vinyl monomer, and a hydrogenated product thereof, organic fibers such as an aromatic polyamide fiber, a diene rubber, a compatibilizer, and the like can each be used as the impact modifier. It should be noted that the term "(meth)acrylic acid" refers to acrylic acid and/or methacrylic acid.

In addition, the content of the impact modifier in the polylactic acid resin composition of the present invention falls within the range of preferably 1 to 20 parts by weight, more preferably 3 to 10 parts by weight with respect to 100 parts by weight of the polylactic acid (component A) from the viewpoints of the impact resistance and moldability of the resin composition.

The polylactic acid resin composition of the present invention can contain a flame retardant, an antioxidant, a lubricant, an antistatic agent, an anti-fogging agent, a light stabilizer, a UV absorber, a pigment, a colorant, an antifungal agent, an antibacterial agent, a foaming agent, or the like as any other component except the foregoing to such an extent that the achievement of the object of the present invention is not impaired.

Production of Polylactic Acid Resin Composition and Resin Molded Article Thereof The polylactic acid resin composition of the present invention can be prepared by: blending the polylactic acid (component A), the specific reaction product (component B) as a plasticizer, and the fatty acid amide (component C) as a crystal nucleating agent, and as required, any other material at predetermined ratios; and melting and mixing the materials at 160 to 240° C. It should be noted that the melting and mixing may be performed after the respective materials have been blended. Alternatively, the composition may be prepared by the following procedure. After the polylactic acid (component A) has been previously melted with an extruder, a Banbury mixer, a kneader, a heating roll, or the like, the other materials are blended into the molten product and then the mixture is shaped into a uniform pellet shape.

Then, a resin molded article can be obtained by using the resin composition melted and mixed as described above as a material through cast molding, injection molding, blow molding, extrusion molding, or the like. In addition, the composition can be molded into various molded articles by molding methods such as vacuum molding, pressure molding, and vacuum pressure molding after the composition has been processed into a sheet.

When the composition is formed with a mold for obtaining the resin molded article, the temperature of the mold at the time of the molding falls within the range of preferably 40 to 140° C., more preferably 70 to 120° C. from the viewpoint of productivity. In addition, the time period for which the resin molded article is held in the mold in vacuum molding, pressure molding, or vacuum pressure molding is preferably 1 to 15 seconds, more preferably 1 to 10 seconds from the viewpoints of productivity and the like.

It should be noted that the thickness of a molded article using the polylactic acid resin composition of the present invention as a material is typically about 0.1 to 0.5 mm. However, for example, when the composition is molded into a molded article having a thickness of 0.4 mm and its cloudiness (haze) is measured with a HAZE meter (trade name: Haze Computer HZ-2, manufactured by Suga Test Instruments, Co., Ltd.), the value can be suppressed to less than 15%, preferably less than 10%. The molded article can be used as a resin molded article having high transparency because its cloudiness (haze) is small as described above. In addition, the polylactic acid resin composition of the present invention shows a small degree of deterioration of its transparency over time and has high heat resistance, and hence the molded article shows, for example, the following characteristic. Even after the molded article has been left to stand under a high temperature around 90° C., nearly no deterioration of its transparency is observed.

In addition, the migration amount of the polylactic acid resin molded article of the present invention was measured in accordance with an migration test method specified in the FCN system concerning a food packaging container of the U.S. Food and Drug Administration (FDA), and then its cumulative estimated daily intake (CEDI) was calculated. Smaller values for the migration amount and the CEDI mean that the migration amount from the molded article is smaller (the molded article is more excellent in migration resistance). The CEDI's of the polylactic acid resin composition of the present invention and the molded article thereof can each be suppressed to less than 1 ppm, preferably less than 0.5 ppm. As described above, their CEDI's are low, and hence the resin composition and the molded article show low migration amounts at the time of their use and can be safely used as food packaging containers. In addition, reductions in physical properties of the resin composition and the molded article are suppressed because their migration amounts are small.

As described above, each of the polylactic acid resin composition of the present invention and the resin molded article thereof is excellent in transparency, heat resistance, and the like, and has high biodegradability. Accordingly, the polylactic acid resin composition of the present invention and the resin molded article thereof can be suitably utilized in applications including: various disposable containers (e.g., food containers such as a tray for fresh food, an instant food container, a fast food container, a lunch box, a beverage bottle, and a container for a flavor such as mayonnaise, an agricultural and horticultural container such as a seedling pot, a blister pack container, and a press-through pack container); CD cases; clear file folders; cards such as a credit card; dinnerware such as a spoon and a drinking straw; plastic models; various resin products such as a resin sheet, a resin film, and a resin hose; and textile goods such as a fiber for clothing and a nonwoven fabric. Further, the polylactic acid resin composition of the present invention can be suitably utilized in wider fields than a conventional polylactic acid resin composition is because its transparency, heat resistance, and the like have been improved as compared to those of the conventional polylactic acid resin composition.

EXAMPLES

Next, examples are described together with comparative examples. However, the present invention is not limited to these examples.

First, the following materials were prepared prior to the examples and the comparative examples.

Polylactic Acid A-1

Polylactic acid (trade name: 4032D, manufactured by Natureworks LLC.)

Plasticizer B-1

Polyoxyethylene sorbitan monococoate (content of oxyethylene group: 72 wt %, trade name: SOLGEN TW-20, manufactured by DAI-ICHI KOGYO SEIYAKU CO., LTD.)

Plasticizer B-2

Polyoxyethylene sorbitan monostearate (content of oxyethylene group: 67 wt %, trade name: SOLGEN TW-60, manufactured by DAI-ICHI KOGYO SEIYAKU CO., LTD.)

Plasticizer B-3

Polyoxyethylene sorbitan monooleate (content of oxyethylene group: 67 wt %, trade name: SOLGEN TW-80, manufactured by DAI-ICHI KOGYO SEIYAKU CO., LTD.)

Plasticizer B-4

Polyoxyethylene sorbitan monobehenate (content of oxyethylene group: 64 wt %, prepared by DAI-ICHI KOGYO SEIYAKU CO., LTD.)

Plasticizer B-5

Polyoxyethylene mannitan monostearate (content of oxyethylene group: 67%, prepared by DAI-ICHI KOGYO SEIYAKU CO., LTD.)

Plasticizer B-6

Polyoxyethylene isosorbide monostearate (content of oxyethylene group: 65 wt %, prepared by DAI-ICHI KOGYO SEIYAKU CO., LTD.)

Plasticizer B-7

Polyoxyethylene sorbitan distearate (content of oxyethylene group: 65 wt %, prepared by DAI-ICHI KOGYO SEIYAKU CO., LTD.)

Plasticizer B-8

Polyoxyethylene sorbitan dilaurate (content of oxyethylene group: 71 wt %, prepared by DAI-ICHI KOGYO SEIYAKU CO., LTD.)

Plasticizer B-9

Polyoxyethylene sorbitan dibehenate (content of oxyethylene group: 62 wt %, prepared by DAI-ICHI KOGYO SEIYAKU CO., LTD.)

Plasticizer B-10

Polyoxyethylene sorbitan monostearate (content of oxyethylene group: 51 wt %, prepared by DAI-ICHI KOGYO SEIYAKU CO., LTD.)

Plasticizer B-11

Polyoxyethylene sorbitan monostearate (content of oxyethylene group: 86 wt %, prepared by DAI-ICHI KOGYO SEIYAKU CO., LTD.)

Plasticizer B-12

Polyoxyethylene sorbitan distearate (content of oxyethylene group: 53 wt %, prepared by DAI-ICHI KOGYO SEIYAKU CO., LTD.)

Plasticizer B-13

Polyoxyethylene sorbitan distearate (content of oxyethylene group: 83 wt %, prepared by DAI-ICHI KOGYO SEIYAKU CO., LTD.)

Plasticizer B-14

Polyoxyethylene sorbitan mono-12-hydroxystearate (content of oxyethylene group: 67 wt %.)

Plasticizer B-15

Polyoxyethylene sorbitan sesquistearate (content of oxyethylene group: 65 wt %.)

Plasticizer b-1

Sorbitan monostearate (content of oxyethylene group: 0 wt %, trade name: SOLGEN 50V, manufactured by DAI-ICHI KOGYO SEIYAKU CO., LTD.)

Plasticizer b-2

Glycerin monostearate (content of oxyethylene group: 0 wt %, trade name: EXCEL S-95, manufactured by Kao Corporation.)

Plasticizer b-3

Diester formed of succinic acid and triethylene glycol monomethyl ether (content of oxyethylene group: 64 wt %.)

Plasticizer b-4

Fatty acid ester of polyglycerin (content of oxyethylene group: 0 wt %, trade name: CHIRABAZOL VR-05, manufactured by Taiyo Kagaku Co., Ltd.)

Crystal Nucleating Agent C-1

N,N'-Ethylenebis-12-hydroxystearic acid amide (trade name: ITOHWAX J-530, manufactured by ITOH OIL CHEMICALS CO., LTD.)

Crystal Nucleating Agent C-2

N,N'-Hexamethylenebis-12-hydroxystearic acid amide (trade name: ITOHWAX J-630, manufactured by ITOH OIL CHEMICALS CO., LTD.)

Crystal Nucleating Agent C-3

N,N'-Xylylenebis-12-hydroxystearic acid amide (trade name: ITOHWAX J-700, manufactured by ITOH OIL CHEMICALS CO., LTD.)

Crystal Nucleating Agent C-4

N,N'-Ethylenebis-8-hydroxycaprylic acid amide (obtained by the production method disclosed in Japanese Patent Application Laid-open No. Sho 63-60956.)

Crystal Nucleating Agent C-5

N,N'-Ethylenebis-2-hydroxybehenic acid amide (obtained by the production method disclosed in Japanese Patent Application Laid-open No. Sho 63-60956.)

Crystal Nucleating Agent c-1

Talc (trade name: MICRO ACE P-6, manufactured by Nippon Talc Co., Ltd.)

Crystal Nucleating Agent c-2

Stearic acid amide (manufactured by TOKYO CHEMICAL INDUSTRY CO., LTD.)

Crystal Nucleating Agent c-3

Montmorillonite, in which an ion between layers is substituted by a dioctadecyldimethylammonium ion (trade name: S-BEN W, manufactured by HOJUN CO., LTD.)

Acrylic Resin D-1

Polymethyl methacrylate (trade name: ACRYPET HV, manufactued by MITSUBISHI RAYON CO., LTD.)

Silica E-1

Silica modified with a poly-D-lactic acid (obtained by Synthesis Example 1 below.)

Synthesis Example 1

10.0 Grams of tetraethoxysilane were dissolved in 990 g of D-lactic acid (manufactured by Purac, 90-mass % aqueous solution), and then subjected to dehydration condensation at 130° C. for 4 hours while the resultant mixture was subjected to nitrogen bubbling. Further, dehydration polymerization was performed by stirring the mixture at 170° C. under a reduced pressure of 5 mmHg for 12 hours. After that, a fluid polymer obtained by the reaction was taken out and cooled to be solidified. Thus, about 680 g of silica modified with a colorless, transparent poly-D-lactic acid (silica content: 0.42%) were obtained.

Silica E-2

Fumed silica (trade name: REOLOSIL QS-102, manufactured by Tokuyama Corporation, content of silica: >99.9%.)

Antioxidant F-1

Hindered phenolic antioxidant (trade name: IRGANOX 1076, manufactured by BASF.)

Examples 1 to 31 and Comparative Examples 1 to 10

The respective materials were blended at ratios shown in Table 1 to Table 5 below, and then the mixtures were heated and kneaded with a biaxial extruder (KZW20-30MG manufactured by TECHNOVEL CORPORATION) under the condition of a temperature of its cylinder of 160 to 190° C. Thus, pellets of resin compositions were obtained. It should be noted that the pellets were dried under reduced pressure at a temperature of 70° C. for 12 hours or more.

The polylactic acid resin compositions (pellets) of the examples and the comparative examples thus obtained were measured and evaluated for their respective characteristics in accordance with the following criteria. Table 1 to Table 5 below show the results together.

Mold Holding Time

A sheet having a thickness of 0.4 mm was produced from each of the pellets with a T-die extruder (manufactured by TECHNOVEL CORPORATION). After that, the sheet was heated from above and below with an infrared heater at about 300° C. to be softened. Subsequently, the sheet was loaded into a mold with its temperature controlled to 90° C., and was then subjected to vacuum pressure molding, followed by removal from the mold. Thus, a resin molded article was obtained. During the removal from the mold, the shortest time required for the resin molded article to be taken out of the mold without any deformation (mold holding time) was measured. It should be noted that productivity becomes higher as the shortest time shortens.

Heat Resistance

The resin molded article (molded article formed of the polylactic acid resin composition) obtained by such mold forming as described above was loaded into an oven at 90° C. and held for 30 minutes. Then, the molded article was evaluated as ○ when no deformation was observed after the heating, or was evaluated as x when the molded article deformed after the heating.

Initial Transparency

The cloudiness (haze) of the resin molded article (initial stage) obtained by such mold forming as described above was measured with a HAZE meter (trade name: Haze Computer HZ-2, manufactured by Suga Test Instruments, Co., Ltd.). It should be noted that a smaller value (%) for the haze means that the resin molded article has better transparency.

Time-Varying Transparency

After the resin molded article had been loaded into an oven at 90° C. and held for 24 hours, its cloudiness (haze) was measured with a HAZE meter (trade name: Haze Computer HZ-2, manufactured by Suga Test Instruments, Co., Ltd.). It should be noted that a smaller value (%) for the haze means that the resin molded article has better transparency.

CEDI

The migration amount of the resin molded article (molded article formed of the polylactic acid resin composition) obtained by such mold forming as described above was measured in accordance with an migration test method specified in the FCN system of the U.S. Food and Drug Administration (FDA), and then its cumulative estimated daily intake (CEDI) was calculated. It should be noted that in the migration test, 10% ethanol was used as a food simulant, and was heated under the conditions of 66° C. and 2 hours. Then, the migration amount was determined by quantifying a substance migrated in the food simulant through gas chromatography, followed by the calculation of the CEDI (ppm). It should be noted that a smaller value for the CEDI means that the resin molded article is more excellent in migration resistance.

TABLE 1

Part(s) by weight

| | | Example | | | | | | | | |
|---|---|---|---|---|---|---|---|---|---|---|
| | | 1 | 2 | 3 | 4 | 5 | 6 | 7 | 8 | 9 |
| Polylactic acid | A-1 | 100 | 100 | 100 | 100 | 100 | 100 | 100 | 100 | 100 |
| Plasticizer | B-1 | 5 | — | — | — | — | — | — | — | — |
| | B-2 | — | 5 | — | — | — | — | — | — | — |
| | B-3 | — | — | 5 | — | — | — | — | — | — |
| | B-4 | — | — | — | 5 | — | — | — | — | — |
| | B-5 | — | — | — | — | 5 | — | — | — | — |
| | B-6 | — | — | — | — | — | 5 | — | — | — |
| | B-7 | — | — | — | — | — | — | 5 | — | — |
| | B-8 | — | — | — | — | — | — | — | 5 | — |
| | B-9 | — | — | — | — | — | — | — | — | 5 |
| Crystal nucleating agent | C-1 | 0.4 | 0.4 | 0.4 | 0.4 | 0.4 | 0.4 | 0.4 | 0.4 | 0.4 |
| | C-2 | — | — | — | — | — | — | — | — | — |
| | C-3 | — | — | — | — | — | — | — | — | — |
| | C-4 | — | — | — | — | — | — | — | — | — |
| | C-5 | — | — | — | — | — | — | — | — | — |
| Acrylic resin | D-1 | — | — | — | — | — | — | — | — | — |
| Silica | E-1 | — | — | — | — | — | — | — | — | — |
| | E-2 | — | — | — | — | — | — | — | — | — |
| Antioxidant | F-1 | 0.3 | 0.3 | 0.3 | 0.3 | 0.3 | 0.3 | 0.3 | 0.3 | 0.3 |
| Mold holding time (s) | | 5 | 5 | 5 | 5 | 5 | 5 | 5 | 5 | 5 |
| Heat resistance | | ○ | ○ | ○ | ○ | ○ | ○ | ○ | ○ | ○ |
| Initial transparency (%) | | 4.5 | 4.5 | 5.2 | 5.1 | 4.5 | 8.9 | 5.1 | 5.1 | 5.2 |
| Time-varying transparency (%) | | 4.9 | 4.9 | 5.8 | 5.8 | 4.9 | 10.5 | 5.3 | 5.2 | 6.0 |
| CEDI (ppm) | | 0.27 | 0.26 | 0.26 | 0.24 | 0.26 | 0.26 | 0.20 | 0.20 | 0.19 |

TABLE 2

Part(s) by weight

| | | Example | | | | | | | | |
|---|---|---|---|---|---|---|---|---|---|---|
| | | 10 | 11 | 12 | 13 | 14 | 15 | 16 | 17 | 18 |
| Polylactic acid | A-1 | 100 | 100 | 100 | 100 | 100 | 100 | 100 | 100 | 100 |
| Plasticizer | B-2 | — | — | — | — | — | — | 5 | 5 | 5 |
| | B-10 | 5 | — | — | — | — | — | — | — | — |
| | B-11 | — | 5 | — | — | — | — | — | — | — |
| | B-12 | — | — | 5 | — | — | — | — | — | — |
| | B-13 | — | — | — | 5 | — | — | — | — | — |
| | B-14 | — | — | — | — | 5 | — | — | — | — |
| | B-15 | — | — | — | — | — | 5 | — | — | — |
| Crystal nucleating agent | C-1 | 0.4 | 0.4 | 0.4 | 0.4 | 0.4 | 0.4 | — | — | — |
| | C-2 | — | — | — | — | — | — | 0.4 | — | — |
| | C-3 | — | — | — | — | — | — | — | 0.4 | — |
| | C-4 | — | — | — | — | — | — | — | — | 0.4 |
| | C-5 | — | — | — | — | — | — | — | — | — |
| Acrylic resin | D-1 | — | — | — | — | — | — | — | — | — |
| Silica | E-1 | — | — | — | — | — | — | — | — | — |
| | E-2 | — | — | — | — | — | — | — | — | — |
| Antioxidant | F-1 | 0.3 | 0.3 | 0.3 | 0.3 | 0.3 | 0.3 | 0.3 | 0.3 | 0.3 |
| Mold holding time (s) | | 5 | 5 | 5 | 5 | 5 | 5 | 5 | 5 | 5 |
| Heat resistance | | ○ | ○ | ○ | ○ | ○ | ○ | ○ | ○ | ○ |
| Initial transparency (%) | | 5.5 | 4.5 | 5.7 | 4.9 | 4.5 | 4.8 | 4.7 | 4.7 | 5.0 |
| Time-varying transparency (%) | | 5.9 | 4.8 | 6.1 | 5.2 | 4.9 | 5.1 | 5.5 | 5.3 | 5.6 |
| CEDI (ppm) | | 0.27 | 0.21 | 0.19 | 0.20 | 0.26 | 0.26 | 0.26 | 0.26 | 0.26 |

TABLE 3

| | | Example | | | | | | | | Part(s) by weight |
|---|---|---|---|---|---|---|---|---|---|---|
| | | 19 | 20 | 21 | 22 | 23 | 24 | 25 | 26 | |
| Polylactic acid | A-1 | 100 | 100 | 100 | 100 | 100 | 100 | 100 | 100 | |
| Plasticizer | B-2 | 5 | 5 | 5 | 3 | 10 | 5 | 5 | 5 | |
| Crystal nucleating agent | C-1 | — | 0.1 | 0.7 | 0.4 | 0.4 | 0.4 | 0.4 | 0.4 | |
| | C-2 | — | — | — | — | — | — | — | — | |
| | C-3 | — | — | — | — | — | — | — | — | |
| | C-4 | — | — | — | — | — | — | — | — | |
| | C-5 | 0.4 | — | — | — | — | — | — | — | |
| Acrylic resin | D-1 | — | — | — | — | — | 5 | — | — | |
| Silica | E-1 | — | — | — | — | — | — | 10 | — | |
| | E-2 | — | — | — | — | — | — | — | 0.1 | |
| Antioxidant | F-1 | 0.3 | 0.3 | 0.3 | 0.3 | 0.3 | 0.3 | 0.3 | 0.3 | |
| Mold holding time (s) | | 5 | 5 | 5 | 5 | 5 | 5 | 5 | 5 | |
| Heat resistance | | ○ | ○ | ○ | ○ | ○ | ○ | ○ | ○ | |
| Initial transparency (%) | | 4.9 | 6.4 | 7.4 | 5.1 | 7.5 | 4.7 | 4.6 | 4.7 | |
| Time-varying transparency (%) | | 5.4 | 7.0 | 8.3 | 6.1 | 8.2 | 5.0 | 5.0 | 5.1 | |
| CEDI (ppm) | | 0.26 | 0.26 | 0.26 | 0.15 | 0.48 | 0.25 | 0.25 | 0.25 | |

TABLE 4

| | | Example | | | | | Part(s) by weight |
|---|---|---|---|---|---|---|---|
| | | 27 | 28 | 29 | 30 | 31 | |
| Polylactic acid | A-1 | 100 | 100 | 100 | 100 | 100 | |
| Plasticizer | B-2 | 0.5 | 1 | 1 | 1 | 1 | |
| Crystal nucleating agent | C-1 | 0.4 | 0.4 | 0.7 | 0.4 | 0.4 | |
| | C-2 | — | — | — | — | — | |
| | C-3 | — | — | — | — | — | |
| | C-4 | — | — | — | — | — | |
| | C-5 | — | — | — | — | — | |
| Acrylic resin | D-1 | — | — | — | 3 | 5 | |
| Silica | E-1 | — | — | — | — | — | |
| | E-2 | — | — | — | — | — | |
| Antioxidant | F-1 | 0.3 | 0.3 | 0.3 | 0.3 | 0.3 | |
| Mold holding time (s) | | 5 | 5 | 5 | 5 | 5 | |
| Heat resistance | | ○ | ○ | ○ | ○ | ○ | |
| Initial transparency (%) | | 5.4 | 5.2 | 5.8 | 4.9 | 5.1 | |
| Time-varying transparency (%) | | 6.2 | 6.0 | 6.4 | 5.9 | 6.0 | |
| CEDI (ppm) | | 0.02 | 0.04 | 0.04 | 0.04 | 0.04 | |

TABLE 5

| | | Comparative Example | | | | | | | | | | Part(s) by weight |
|---|---|---|---|---|---|---|---|---|---|---|---|---|
| | | 1 | 2 | 3 | 4 | 5 | 6 | 7 | 8 | 9 | 10 | |
| Polylactic acid | A-1 | 100 | 100 | 100 | 100 | 100 | 100 | 100 | 100 | 100 | 100 | |
| Plasticizer | B-2 | — | — | — | — | — | 5 | 5 | 5 | 5 | — | |
| | b-1 | 5 | — | — | — | — | — | — | — | — | — | |
| | b-2 | — | 5 | — | — | — | — | — | — | — | — | |
| | b-3 | — | — | 5 | — | — | — | — | — | — | — | |
| | b-4 | — | — | — | 5 | — | — | — | — | — | — | |
| Crystal nucleating agent | C-1 | 0.4 | 0.4 | 0.4 | 0.4 | 0.4 | — | — | — | — | — | |
| | C-2 | — | — | — | — | — | — | — | — | — | — | |
| | C-3 | — | — | — | — | — | — | — | — | — | — | |
| | C-4 | — | — | — | — | — | — | — | — | — | — | |
| | C-5 | — | — | — | — | — | — | — | — | — | — | |
| | c-1 | — | — | — | — | — | 0.4 | — | — | — | — | |
| | c-2 | — | — | — | — | — | — | 0.4 | — | — | — | |
| | c-3 | — | — | — | — | — | — | — | 0.4 | — | — | |
| Acrylic resin | D-1 | — | — | — | — | — | — | — | — | — | — | |
| Silica | E-1 | — | — | — | — | — | — | — | — | — | — | |
| | E-2 | — | — | — | — | — | — | — | — | — | — | |
| Antioxidant | F-1 | 0.3 | 0.3 | 0.3 | 0.3 | 0.3 | 0.3 | 0.3 | 0.3 | 0.3 | 0.3 | |
| Mold holding time (s) | | 25 | 45 | 20 | 25 | 25 | 45 | 60 | 60 | 60 | 600 | |
| Heat resistance | | x | x | ○ | ○ | ○ | ○ | x | x | x | ○ | |
| Initial transparency (%) | | 73 | 67 | 15 | 25 | 26 | 72 | 72 | 72 | 84 | 91 | |
| Time-varying transparency (%) | | 94 | 93 | 40 | 47 | 44 | 86 | 92 | 84 | 94 | 94 | |
| CEDI (ppm) | | 2.84 | 3.44 | 3.24 | 0.25 | 0.01 | 0.26 | 0.26 | 0.26 | 0.26 | 0.01 | |

As can be seen from the results of Table 1 to Table 5, the polylactic acid resin compositions of the examples each had high productivity because their mold holding times were shorter than those of the polylactic acid resin compositions of the comparative examples. Further, the polylactic acid resin compositions of the examples were each excellent in heat resistance because none of the resin molded articles thereof showed deformation due to heating. In addition, the polylactic acid resin compositions of the examples each had small values for the cloudiness (haze) of the resin molded article at the initial stage and after the heat resistance test and were each excellent in transparency and migration resistance as compared to the polylactic acid resin compositions of the comparative examples.

The polylactic acid resin composition of the present invention and the resin molded article thereof can be suitably utilized in applications including: various disposable containers (e.g., food containers such as a tray for fresh food, an instant food container, a fast food container, a lunch box, a beverage bottle, and a container for a flavor such as mayonnaise, an agricultural and horticultural container such as a seedling pot, a blister pack container, and a press-through pack container); CD cases; clear file folders; cards such as a credit card; dinnerware such as a spoon and a drinking straw; plastic models; various resin products such as a resin sheet, a resin film, and a resin hose; and textile goods such as a fiber for clothing and a nonwoven fabric. Further, the polylactic acid resin composition of the present invention can be suitably utilized in wider fields than a conventional polylactic acid resin composition is because its transparency, heat resistance, migration resistance, and the like have been improved as compared to those of the conventional polylactic acid resin composition.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A polylactic acid resin composition, comprising:
(i) a polylactic acid;
(ii) a reaction product of:
at least one selected from the group consisting of sorbitol, mannitol, and dehydration condensates thereof,
an alkylene oxide comprising ethylene oxide, wherein the ethylene oxide accounts for over half of the alkylene oxide, and
a fatty acid comprising 8 to 24 carbon atoms, and
(iii) a fatty acid amide comprising a hydroxyl group;
wherein the fatty acid amide (iii) comprises a bisamide compound obtained by reacting a fatty acid comprising 8 to 24 carbon atoms and a hydroxyl group with a compound comprising two amino groups,
wherein a content of the reaction product (ii) falls within a range of 0.5 to 10 parts by weight with respect to 100 parts by weight of the polylactic acid (i), and
wherein a content of the fatty acid amide (iii) falls within a range of 0.1 to 0.7 parts by weight with respect to 100 parts by weight of the polylactic acid (i).

2. The polylactic acid resin composition according to claim 1, wherein the reaction product (ii) comprises 30 to 95 wt % of an oxyethylene group.

3. The polylactic acid resin composition according to claim 1, wherein the reaction product (ii) comprises a hydroxyl group derived from the alkylene oxide.

4. The polylactic acid resin composition according to claim 1, wherein the reaction product (ii) comprises 0.5 or more and less than 2.5 ester groups on average in a molecule thereof.

5. The polylactic acid resin composition according to claim 1, wherein said alkylene oxide is entirely formed of the ethylene oxide.

6. A resin molded article comprising a polylactic acid resin composition comprising:
(i) a polylactic acid;
(ii) a reaction product of:
at least one selected from the group consisting of sorbitol, mannitol, and dehydration condensates thereof,
an alkylene oxide comprising ethylene oxide, wherein the ethylene oxide accounts for over half of the alkylene oxide, and
a fatty acid comprising 8 to 24 carbon atoms, and
(iii) a fatty acid amide comprising a hydroxyl group;
wherein the fatty acid amide (iii) comprises a bisamide compound obtained by reacting a fatty acid comprising 8 to 24 carbon atoms and a hydroxyl group with a compound comprising two amino groups,
wherein a content of the reaction product (ii) falls within a range of 0.5 to 10 parts by weight with respect to 100 parts by weight of the polylactic acid (i), and
wherein a content of the fatty acid amide (iii) falls within a range of 0.1 to 0.7 parts by weight with respect to 100 parts by weight of the polylactic acid (i).

7. The resin molded article according to claim 6, wherein the reaction product (ii) comprises 30 to 95 wt % of an oxyethylene group.

8. The resin molded article according to claim 6, wherein the reaction product (ii) comprises a hydroxyl group derived from the alkylene oxide.

9. The resin molded article according to claim 6, wherein the reaction product (ii) comprises 0.5 or more and less than 2.5 ester groups on average in a molecule thereof.

10. The resin molded article according to claim 6, wherein said alkylene oxide is entirely formed of the ethylene oxide.

11. The polylactic acid resin composition according to claim 1,
wherein the reaction product (ii) comprises 30 to 95 wt % of an oxyethylene group, and
wherein the reaction product (ii) comprises 0.5 or more and 2.0 or less ester groups on average in a molecule thereof.

12. The resin molded article according to claim 6,
wherein the reaction product (ii) comprises 30 to 95 wt % of an oxyethylene group, and
wherein the reaction product (ii) comprises 0.5 or more and 2.0 or less ester groups on average in a molecule thereof.

13. The polylactic acid resin composition according to claim 1,
wherein a haze of the composition, having a thickness of 0.4 mm, subjected to heat at 90° C. for 24 hours, is suppressed to less than 15%, wherein a cumulative estimated daily intake (CEDI) value of the composition in which 10% ethanol is used as a simulant solvent, subjected to heat at 66° C. for 2 hours, is suppressed to less than 1 ppm, and wherein a mold holding time of the composition having a thickness of 0.4 mm, subjected to heat at 300° C. and loading into a mold at 90° C., is 1 to 10 seconds.

14. The resin molded article according to claim 6, wherein a haze of the composition, having a thickness of 0.4 mm, subjected to heat at 90° C. for 24 hours, is suppressed to less than 15%, wherein a cumulative estimated daily intake (CEDI) value of the composition in which 10% ethanol is used as a simulant solvent, subjected to heat at 66° C. for 2 hours, is suppressed to less than 1 ppm, and wherein a mold holding time of the composition having a thickness of 0.4 mm, subjected to heat at 300° C. and loading into a mold at 90° C., is 1 to 10 seconds.

15. The polylactic acid resin composition according to claim 13, wherein the reaction product (ii) comprises 30 to 95 wt % of an oxyethylene group.

16. The polylactic acid resin composition according to claim 13, wherein the reaction product (ii) comprises a hydroxyl group derived from the alkylene oxide.

17. The polylactic acid resin composition according to claim 13, wherein the reaction product (ii) comprises 0.5 or more and less than 2.5 ester groups on average in a molecule thereof.

18. The polylactic acid resin composition according to claim 13, wherein said alkylene oxide is entirely formed of the ethylene oxide.

19. The polylactic acid resin composition according to claim 13, wherein the reaction product (ii) comprises 30 to 95 wt % of an oxyethylene group, and wherein the reaction product (ii) comprises 0.5 or more and 2.0 or less ester groups on average in a molecule thereof.

20. The resin molded article according to claim 14, wherein the reaction product (ii) comprises 30 to 95 wt % of an oxyethylene group.

21. The resin molded article according to claim 4, wherein the reaction product (ii) comprises a hydroxyl group derived from the alkylene oxide.

22. The resin molded article according to claim 14, wherein the reaction product (ii) comprises 0.5 or more and less than 2.5 ester groups on average in a molecule thereof.

23. The resin molded article according to claim 14, wherein said alkylene oxide is entirely formed of the ethylene oxide.

24. The resin molded article according to claim 14, wherein the reaction product (ii) comprises 30 to 95 wt % of an oxyethylene group, and wherein the reaction product (ii) comprises 0.5 or more and 2.0 or less ester groups on average in a molecule thereof.

* * * * *

UNITED STATES PATENT AND TRADEMARK OFFICE
CERTIFICATE OF CORRECTION

PATENT NO. : 9,518,168 B2
APPLICATION NO. : 14/603159
DATED : December 13, 2016
INVENTOR(S) : Hideaki Onishi et al.

It is certified that error appears in the above-identified patent and that said Letters Patent is hereby corrected as shown below:

In the Claims

Column 22 Line 14:

Change

21. The resin molded article according to claim "4", wherein

To be

21. The resin molded article according to claim --14--, wherein

Signed and Sealed this
Twenty-first Day of March, 2017

Michelle K. Lee
*Director of the United States Patent and Trademark Office*